United States Patent
Lee et al.

(10) Patent No.: US 9,681,063 B2
(45) Date of Patent: Jun. 13, 2017

(54) METHOD OF GENERATING IMAGE BY COMPENSATING EXCLUDED PIXEL DATA AND IMAGE GENERATION DEVICE THEREWITH

(71) Applicant: SAMSUNG ELECTRONICS CO., LTD., Suwon-si, Gyeonggi-do (KR)

(72) Inventors: Joonho Lee, Seoul (KR); Daekwan Kim, Suwon-si (KR); Taechan Kim, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 28 days.

(21) Appl. No.: 14/608,716

(22) Filed: Jan. 29, 2015

(65) Prior Publication Data

US 2015/0244945 A1  Aug. 27, 2015

(30) Foreign Application Priority Data

Feb. 24, 2014  (KR) .................. 10-2014-0021410

(51) Int. Cl.
*H04N 5/262* (2006.01)
*H04N 5/232* (2006.01)

(52) U.S. Cl.
CPC ....... *H04N 5/2621* (2013.01); *H04N 5/23212* (2013.01); *H04N 5/23229* (2013.01)

(58) Field of Classification Search
CPC ............. H04N 5/2621; H04N 5/23229; H04N 5/23212
See application file for complete search history.

(56) References Cited

U.S. PATENT DOCUMENTS

| | | | |
|---|---|---|---|
| 5,570,433 A | 10/1996 | Nagamine et al. | |
| 6,330,371 B1 * | 12/2001 | Chen | H04N 5/2353 250/347 |
| 6,917,718 B2 | 7/2005 | Ichimura | |
| 7,945,121 B2 | 5/2011 | Wei et al. | |
| 8,004,564 B1 * | 8/2011 | Hughes | H04N 5/3651 348/164 |
| 8,248,674 B2 | 8/2012 | Kurigata | |
| 8,385,678 B2 | 2/2013 | Lim et al. | |
| 8,405,886 B2 | 3/2013 | Kurigata | |
| 8,441,545 B2 | 5/2013 | Hoda et al. | |

(Continued)

OTHER PUBLICATIONS

Kim et al.—A 1.5Mpixel RGBZ CMOS Image Sensor for Simultaneous Color and Range Image Capture, 2012 IEEE Inter. Solid-State Circuits Conf. Feb. 22, 2012.

*Primary Examiner* — Jason Flohre
(74) *Attorney, Agent, or Firm* — Lee & Morse, P.C.

(57) ABSTRACT

A method of generating an image using an image capturing device includes generating an imperfect image excluding data corresponding to one or more pixel sensors by capturing an object while the object is focused. A defocused image is generated to include the data corresponding to the one or more pixel sensors generated using neighboring pixel sensors around the one or more pixel sensors while the object is defocused. The data corresponding to the one or more pixel sensors is extracted based on data in the generated imperfect image and data in the generated defocused image. A final image is then generated by reflecting the extracted data to at least one of the generated imperfect image or the generated defocused image.

14 Claims, 13 Drawing Sheets

(56) References Cited

U.S. PATENT DOCUMENTS

| | | |
|---|---|---|
| 8,456,645 B2 | 6/2013 | Gharib et al. |
| 8,503,819 B2 | 8/2013 | Chen |
| 8,542,933 B2 | 9/2013 | Venkataraman et al. |
| 8,587,702 B2 | 11/2013 | Hara |
| 8,648,940 B2 | 2/2014 | Ogawa |
| 2003/0039402 A1* | 2/2003 | Robins ............... G06T 5/20 382/275 |
| 2010/0027906 A1* | 2/2010 | Hara ............... G06T 7/0085 382/264 |
| 2011/0025875 A1 | 2/2011 | Imade |
| 2012/0075527 A1 | 3/2012 | Fazzini |
| 2012/0176532 A1 | 7/2012 | Hara |
| 2013/0038758 A1 | 2/2013 | Imade |
| 2013/0258170 A1 | 10/2013 | Tamaki |
| 2013/0278754 A1 | 10/2013 | Oh |
| 2013/0300828 A1* | 11/2013 | Yamato ............ G03B 35/08 348/44 |

* cited by examiner

METHOD OF GENERATING IMAGE BY COMPENSATING EXCLUDED PIXEL DATA AND IMAGE GENERATION DEVICE THEREWITH

CROSS-REFERENCE TO RELATED APPLICATIONS

Korean Patent Application No. 10-2014-0021410, filed on Feb. 24, 2014, and entitled "Image Generating Method By Compensating Excluded Pixel Data and Image Generating Device Therewith," is incorporated by reference herein in its entirety.

BACKGROUND

1. Field

One or more embodiments described herein relate to a method of generating an image by compensating excluded pixel data and an image generating device therewith.

2. Description of the Related Art

A device generating and processing an image by using digital data is widely being used. A technology of generating and processing the image by using the digital data is being employed in various electronic devices, such as a digital camera, a portable phone, a tablet, etc.

A camera module equipped in an electronic device includes an image sensor. The image sensor includes a filter array and a photo-sensitive device array. Each of the filter array and the photo-sensitive device is formed by pixel units. Generally, a filter disposed at each pixel passes visible light having a specific frequency characteristic. For instance, the filter disposed at each pixel may be one of filters passing red light, green light and blue light. The photo-sensitive device corresponding to the filter generates an electrical signal based on intensity of the visible light which passed the filter.

The image sensor recently being used is embodied in a variety of forms. In particular, the image sensor may include a pixel for performing a function other than a visible light sensing function. For instance, the image sensor may further include an infrared filter used to measure a distance between an object and the image sensor.

However, the pixel for performing the function other than the visible light sensing function does not perform a function which is directly needed to generate the image. Thus, if one or more pixels for performing the function other than the visible light sensing function are included in the image sensor, the quality of the generated image may be degraded. In a worst case, the image sensor cannot properly recognize the object.

SUMMARY

In accordance with one embodiment, a method of generating an image uses an image capturing device. The method includes generating an imperfect image excluding data corresponding to one or more pixel sensors by capturing an object while the object is focused, generating a defocused image including the data corresponding to the one or more pixel sensors generated by using neighboring pixel sensors around the one or more pixel sensors while the object is defocused, extracting the data corresponding to the one or more pixel sensors based on data included in the generated imperfect image and data included in the generated defocused image, and generating a final image by reflecting the extracted data to at least one of the generated imperfect image and the generated defocused image.

In accordance with another embodiment, an image generation device includes a lens configured to receive light reflected from an object, an image sensor configured to generate an electric signal based on a characteristic of the received light, an image signal processor configured to generate a final image based on a characteristic of the generated electric signal, and a controller configured to control operations of the lens, the image sensor and the image signal processor. The image signal processor may generate an imperfect image excluding data corresponding to one or more pixel sensors based on a characteristic of the electric signal generated by capturing the object which the object is focused according to a control of the controller, generate a defocused image including the data corresponding to the one or more pixel sensors generated by using neighboring pixel sensors around the one or more pixel sensors while the object is defocused according to the control of the controller, extract the data corresponding to the one or more pixel sensors based on data included in the generated imperfect image and data included in the generated defocused image, and generate the final image by reflecting the extracted data to at least one of the generated imperfect image and the generated defocused image.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
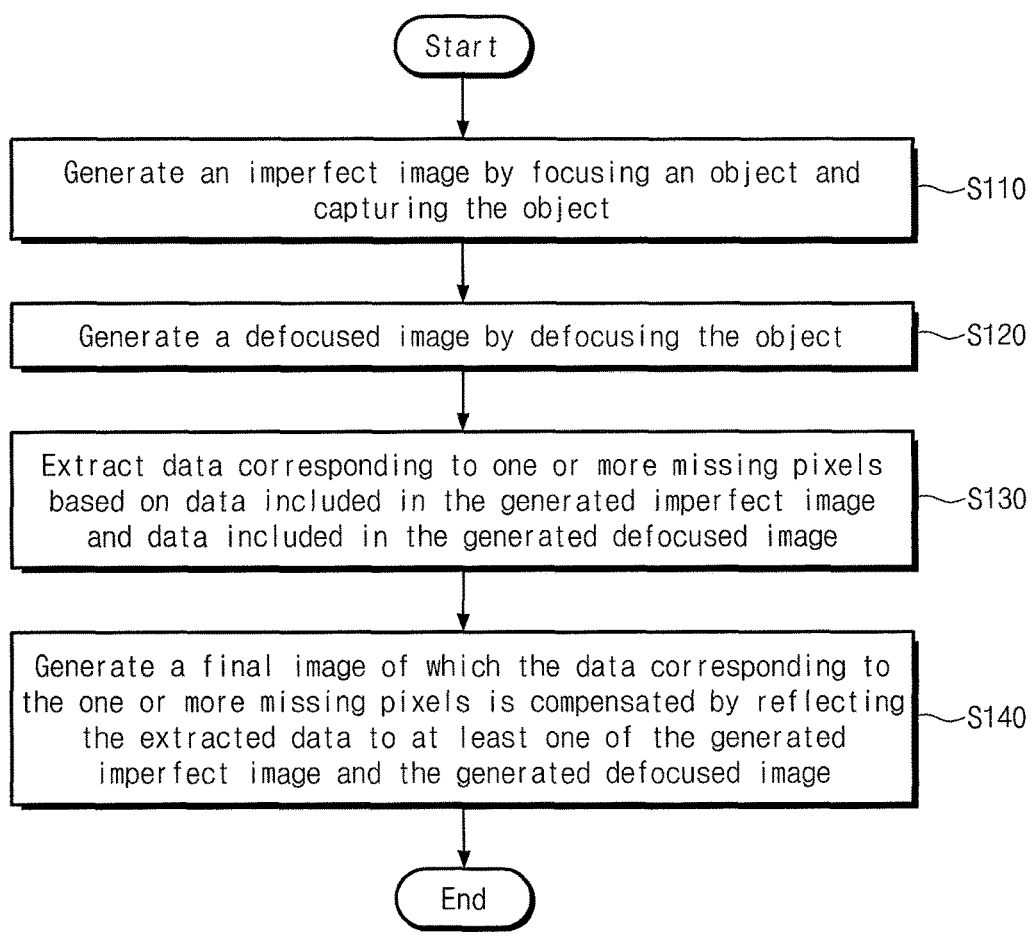
FIG. 1 illustrates one embodiment of a method of generating an image.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

FIG. 1 is a flow chart illustrating an embodiment of a method of generating an image. In this method, data corresponding to one or more missing pixels may be compensated.

A missing pixel may not perform an image sensing function. For instance, the missing pixel may be an image sensing pixel that does not perform the image sensing function because the missing pixel has a defect. Alternatively, the missing pixel may be a pixel performing a function other than the image sensing function. There may be one or more missing pixels. Information about one or more missing pixels may be collected in advance before the method of generating of the image in FIG. 1 is performed. Alternatively, the information about one or more missing pixels may be collected by performing an algorithm for detecting the missing pixel while the method of generating the image in FIG. 1 is performed.

In operation S110, an imperfect image may be generated. The imperfect image may be generated by capturing an object while the object is focused. The object is a capturing target. Since the missing pixel does not perform the image sensing function, data corresponding to the missing pixel may not be generated. The imperfect image may not include the data corresponding to one or more missing pixels. Generating the imperfect image will be described in detail with reference to FIGS. 3 and 4.

In operation S120, a defocused image may be generated. According to one embodiment, the defocused image may be generated by defocusing the object. Methods of defocusing the object may be embodied in a variety of forms. Embodiments of generating the defocused image will be described in detail with reference to FIGS. 2 and 7.

If the object is defocused, an area corresponding to an image captured on the missing pixel may be widened. If the area corresponding to the image captured on the missing pixel is widened, the image focused on the missing pixel may affect pixels around the missing pixel. Accordingly, the data corresponding to the missing pixel may be generated through the pixels around the missing pixel, or data corresponding to the pixels around the missing pixel may be reflected to the missing pixel. Consequently, the defocused image generated according to the embodiments may include the data corresponding to the missing pixel.

In operations S110 and S120, the imperfect image and the defocused image may be captured under different conditions from each other. In operation S110, the object is focused, and the imperfect image may be generated. In operation 5120, the object is defocused, and the defocused image may be generated. The operations S110 and S120 may not affect each other. Thus, a sequence of operations S110 and S120 may be reversed.

In operation S130, the data corresponding to the missing pixel may be extracted. The imperfect image generated in the operation S110 may not include the data corresponding to the missing pixel. The defocused image generated in the operation S120 may include the data corresponding to the missing pixel. Thus, the data corresponding to the missing pixel may be extracted based on the imperfect image generated in operation S110 and the defocused image generated in the operation S120. An embodiment of extracting the data corresponding to the missing pixel will be described in detail with reference to FIG. 8.

In operation S140, a final image may be generated. While the final image is generated, the data corresponding to the missing pixel may be compensated. The data corresponding to the missing pixel may be compensated by reflecting the data extracted in operation S130 to at least one of the imperfect image generated in operation S110 and the defocused image generated in operation S120. An embodiment of generating the final image will be described in detail with reference to FIG. 9.

Figure 2:
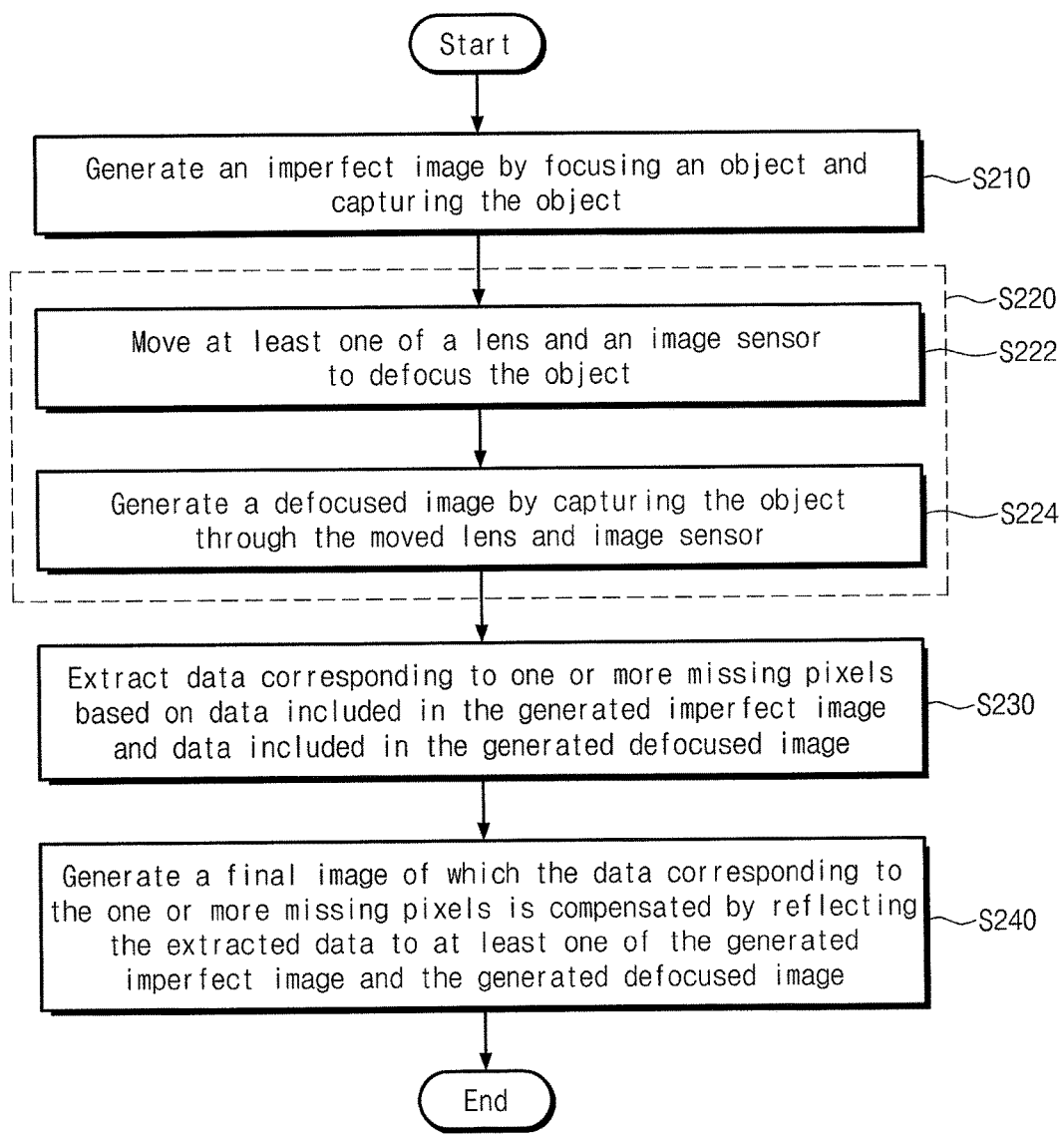
FIG. 2 illustrates another embodiment of a method of generating an image.

FIG. 2 illustrates another embodiment of a method of generating an image. In particular, FIG. 2 is a flow chart explaining a process of generating a defocused image in detail. Processes of operations S210, S230 and S240 in FIG. 2 may include the processes of the operations S110, S130 and S140 in FIG. 1, respectively. The descriptions of common features already discussed in FIG. 1 are omitted. An operation S220 may include an operation S222 and an operation S224.

In operation S222, at least one of a lens and an image sensor may move. An object may be focused or defocused depending on a distance between the lens and the image sensor. That is, when at least one of the lens and the image sensor moves, the object may be defocused. Since the defocused image is generated by defocusing the object, at least one of the lens and the image sensor may move to defocus the object. In operation S222, only one of the lens and the image sensor may move. Alternatively, if necessary, both of the lens and the image sensor may move.

In operation S224, the defocused image may be generated. The defocused image may be generated by capturing the object through the lens and/or the image sensor moved in operation S222. Through operations S222 and S224, the object may be defocused and thereby the defocused image may be generated.

Figure 3:
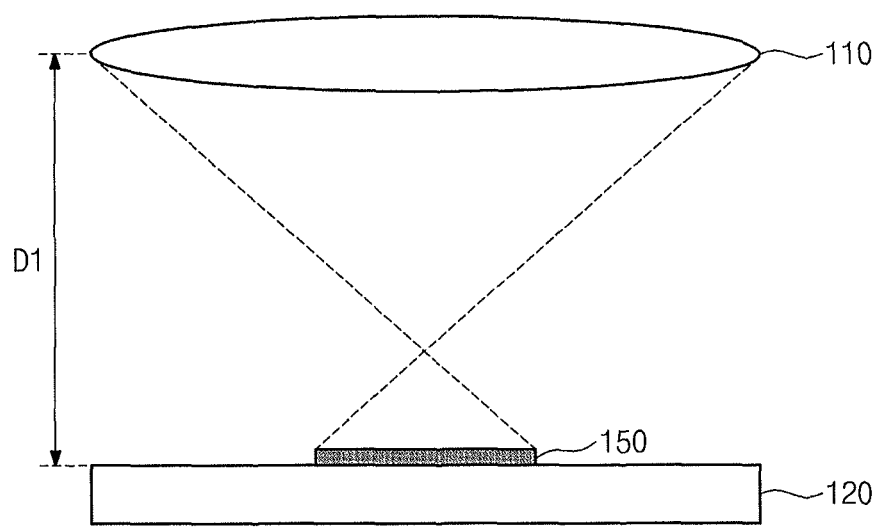
FIGS. 3 and 4 illustrate an example of capturing an object while the object is focused.
Figure 4:
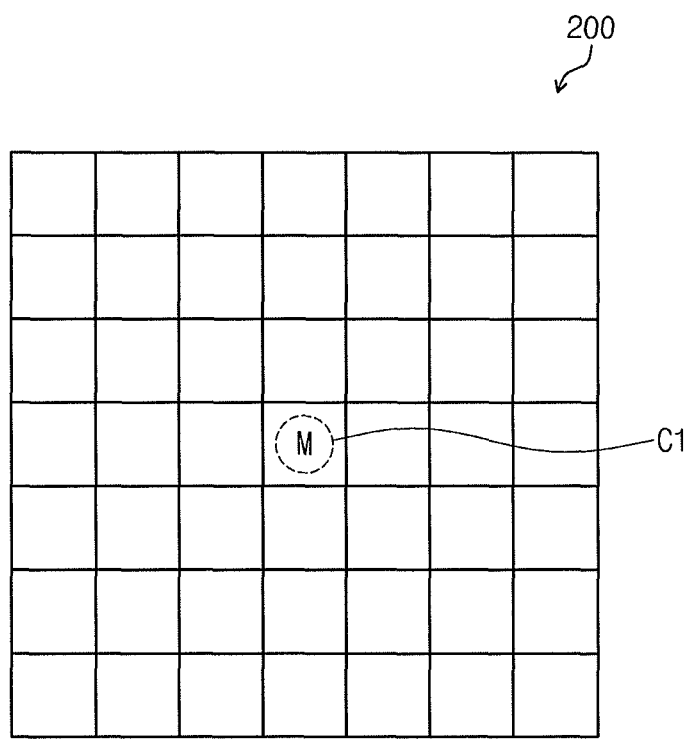

FIGS. 3 and 4 are schematic diagrams illustrating a case of capturing an object while the object is focused. FIG. 3 illustrates a state that an image 150 is captured on an image sensor 120 through a lens 110. FIG. 4 illustrates a pixel array 200 including a missing pixel M.

Referring to FIG. 3, light reflected from the object (not shown) reaches the image sensor 120 through the lens 110. If the lens 110 is spaced apart from the image sensor 120 by a focal length D1, the object is focused. In FIG. 3, an image being generated based on the image 150 focused on the image sensor 120 may be an imperfect image. As described with reference to FIG. 1, the imperfect image may not include data corresponding to the missing pixel M.

Referring to FIG. 4, the pixel array 200 may include the missing pixel M. The missing pixel M may not perform an image sensing function. Thus, data with respect to an area C1 corresponding to an image captured on the missing pixel M may not be generated. Consequently, the imperfect image may not include the data corresponding to the missing pixel M. Thus, when the missing pixel M is included in the pixel array 200, a part of data for forming the image may not be generated, and thereby the quality of the generated image may be degraded (that is, the imperfect image may be generated). Further, if too many missing pixels M are included in the pixel array 200, in the worst case, the image sensor 120 may not properly recognize the object.

Figure 5:
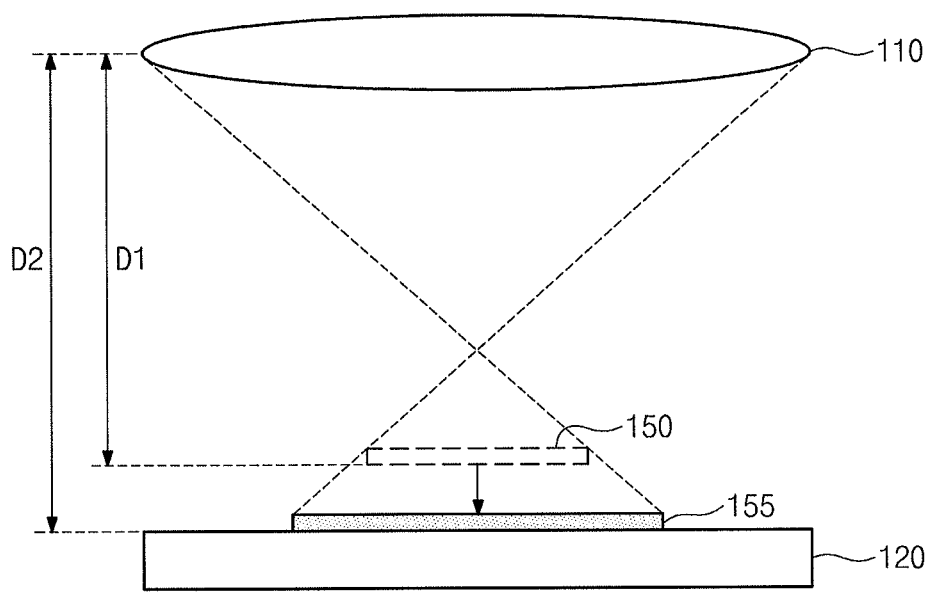
FIGS. 5 and 6 illustrate an example of capturing an object while the object is defocused.
Figure 6:
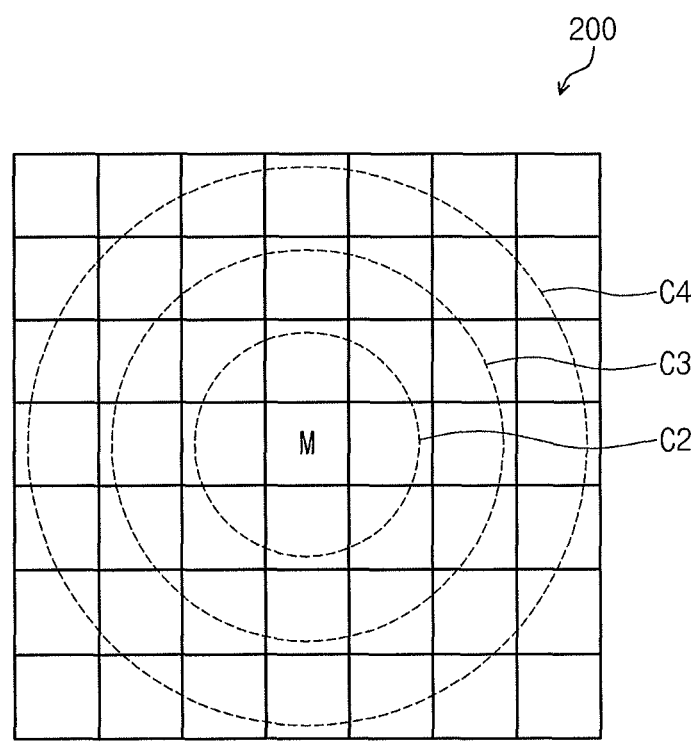

FIGS. 5 and 6 are schematic diagrams illustrating a case of capturing an object while the object is defocused. FIG. 5 illustrates a state that an image 155 is captured on an image sensor 120 through a lens 110. FIG. 6 illustrates a pixel array 200 including a missing pixel M.

Referring to FIG. 5, light reflected from the object (not shown) reaches the image sensor 120 through the lens 110. In FIG. 5, at least one of the lens 110 and the image sensor 120 may move, and thereby the lens 110 may be spaced apart from the image sensor 120 by a distance D2 that is longer than the focal length Dl. Thus, unlike the case that an image is focused at the focal length D1, the object is defocused. An image generated based on the image 155 captured on the image sensor 120 may be a defocused image. As described with reference to FIG. 1, the defocused image may include data corresponding to the missing pixel M.

Referring to FIG. 6, the pixel array may include the missing pixel M. Since the object is defocused, an area corresponding to an image captured on the missing pixel M may be widened (refer to C2, C3, C4), and thereby the image captured on the missing pixel M may affect pixels around the missing pixel M. Fundamentally, since the missing pixel M does not perform an image sensing function, data corresponding to the missing pixel M may not be generated. However, according to the present disclosure, since the image captured on the missing pixel M affects the pixels around the missing pixel M, the data corresponding to the missing pixel M may be generated through "neighboring" pixels performing the image sensing function. Consequently, the defocused image may include the data corresponding to the missing pixel M.

The degree of defocusing for generating the defocused image may vary as necessary. For instance, the area corresponding to the image captured on the missing pixel M may be widened to the "neighboring" pixels around the missing pixel M (refer to C2). However, in some cases, such as a case that adjacent pixels around the missing pixel M do not perform the image sensing function or a case that it is needed to use more neighboring pixels according to an environment, the area corresponding to the image captured on the missing pixel M may be further widened (refer to C3, C4). That is, in some embodiments, the degree of defocusing may vary as necessary. The degree of defocusing may be varied by adjusting a distance between the lens 110 and the image sensor 120.

In one or more embodiments, data used to generate data corresponding to the missing pixel may not be data corresponding to pixels other than the missing pixel M. That is, the data corresponding to the missing pixel M may not be inferred based on the data corresponding to pixels other than the missing pixel M. Instead, in at least one embodiment, the data corresponding to the missing pixel M may be generated by defocusing the object. Even though the missing pixel M may not perform the image sensing function, the data corresponding to the missing pixel M may be generated by defocusing the object and using the "neighboring" pixels.

Thus, when the data corresponding to the missing pixel M is generated according to one or more embodiments, a final image having higher quality and higher reliability may be generated as compared with the case that data corresponding to the missing pixel M is inferred by mathematical or heuristic techniques. In addition, even in the case that it is difficult to be restored for the data corresponding to the missing pixel M, the data corresponding to the missing pixel M may be generated. In particular, the embodiments may flexibly cope with a distribution of one or more missing pixels by adjusting the degree of defocusing.

Figure 7:
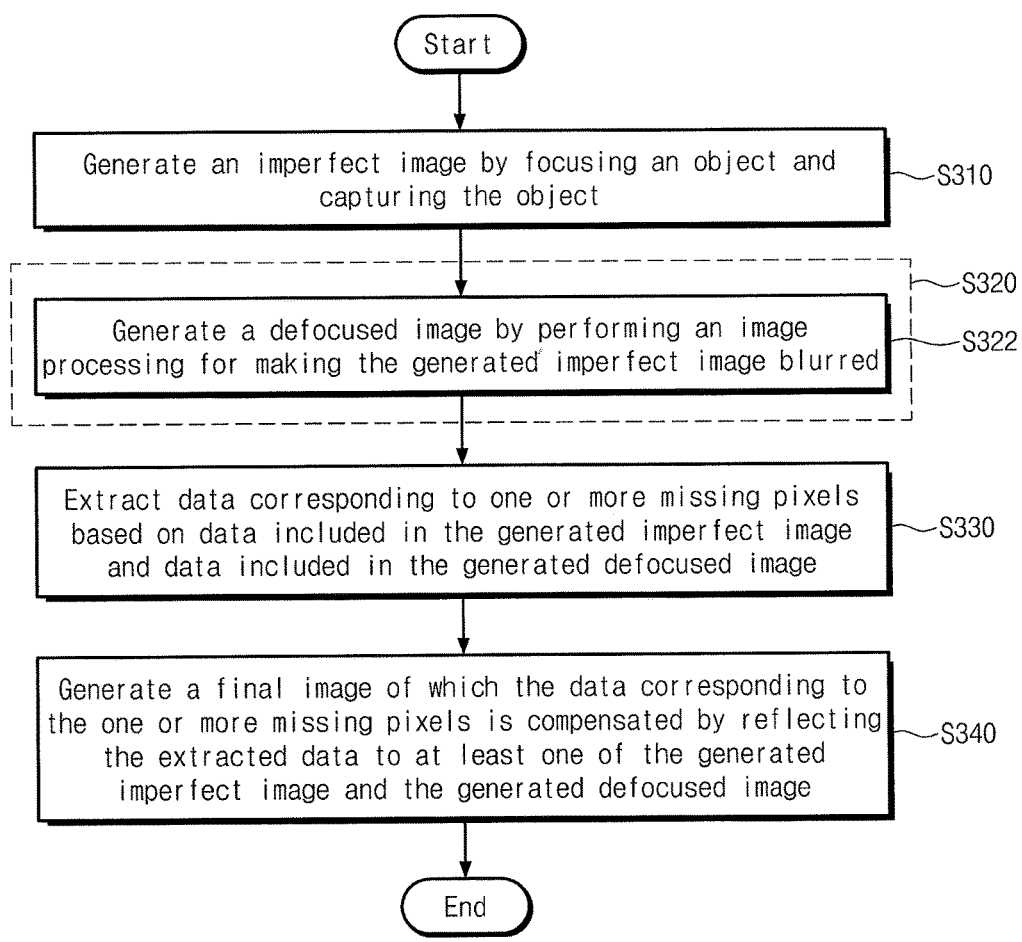
FIGS. 7 to 9 illustrate other embodiments of a method of generating an image.

FIG. 7 illustrates an embodiment of a method of generating an image. In particular, FIG. 7 is a flow chart explaining another process of generating a defocused image in detail. Processes of operations S310, S330 and S340 in FIG. 7 may include the processes of operations S110, S130 and S140 in FIG. 1, respectively. The descriptions of common features already discussed in FIG. 1 are omitted. An operation S320 may include an operation S322.

In operation S322, the defocused image may be generated. The defocused image may be generated by performing an image processing for making an imperfect image generated in operation S310 defocused. That is, unlike the case that at least one of the lens and the image sensor moves in the embodiment in FIG. 2, the image processing may be performed on the imperfect image in the embodiment in FIG. 7. For instance, the image processing for making the imperfect image defocused may be performing a blur filter operation with respect to data corresponding to pixels forming the imperfect image. That is, the defocused image may be generated by performing the blur filter operation on the data corresponding to the pixels forming the imperfect image.

The imperfect image generated in the operation S310 may not include data corresponding to a missing pixel. When the image processing (e.g., the blur filter operation) for making the imperfect image defocused is performed, data corresponding to "neighboring" pixels around the missing pixel may be reflected in the missing pixel. In the embodiment in FIG. 7, the data corresponding to the missing pixel may be generated by using the "neighboring" pixels around the missing pixel. Consequently, the defocused image may include the data corresponding to the missing pixel. According to one embodiment, the image having high quality and high reliability may be generated.

Figure 8:
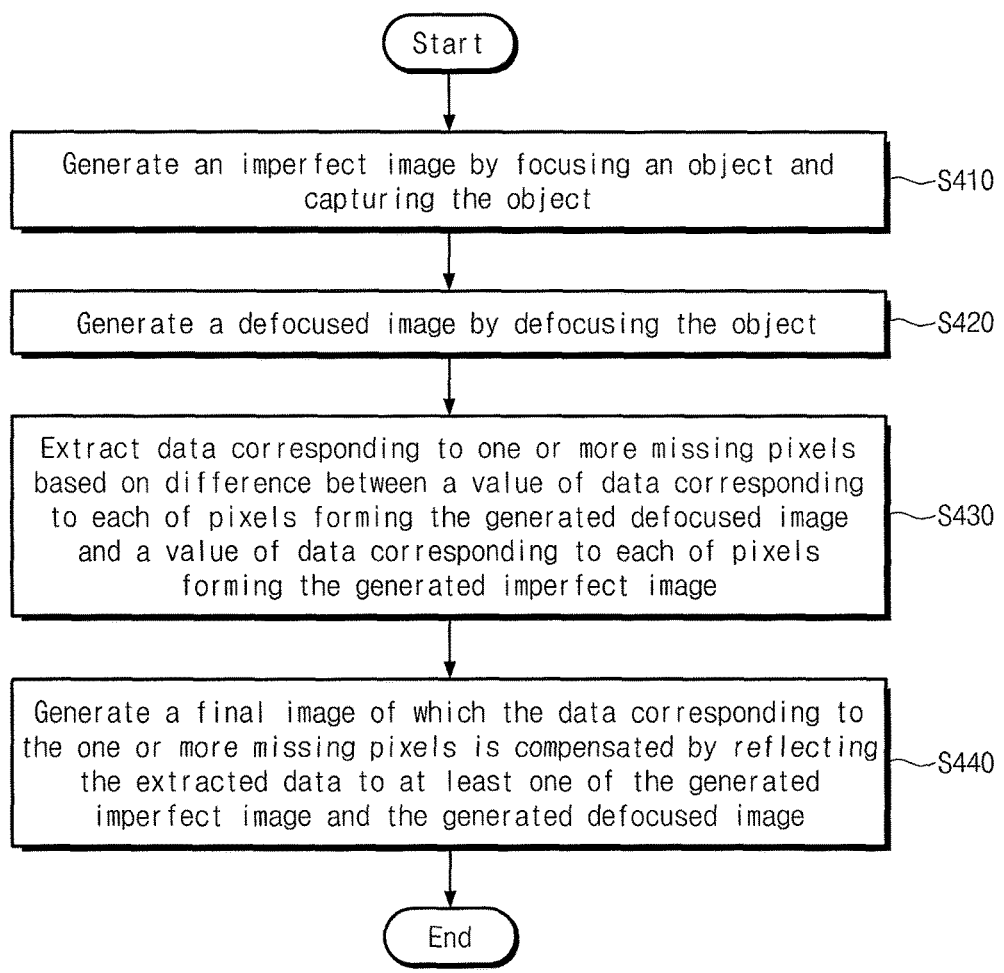

FIG. 8 illustrates another embodiment of method of generating an image. In particular, FIG. 8 is a flow chart explaining a process of extracting data corresponding to one or more missing pixels in detail. Processes of operations S410, S420 and S440 in FIG. 7 may include the processes of the operations S110, S120 and S140 in FIG. 1, respectively. The descriptions of common features already discussed in FIG. 1 are omitted.

In operation S430, data corresponding to a missing pixel may be extracted. The data corresponding to the missing pixel may be extracted based on data included in an imperfect image generated in operation S410 and data included in a defocused image generated in operation S420.

More particularly, the data corresponding to the missing pixel may be extracted based on a difference between values of data respectively corresponding to pixels forming the defocused image generated in operation S420 and values of data respectively corresponding to pixels forming the imperfect image generated in operation S410. The imperfect image generated in operation S410 may not include the data corresponding to the missing pixel. The defocused image generated in operation S420 may include the data corresponding to the missing pixel. Thus, when the difference between the values of the data respectively corresponding to the pixels forming each of the defocused image and the imperfect image is calculated, the data corresponding to the missing pixel may be extracted.

Figure 9:
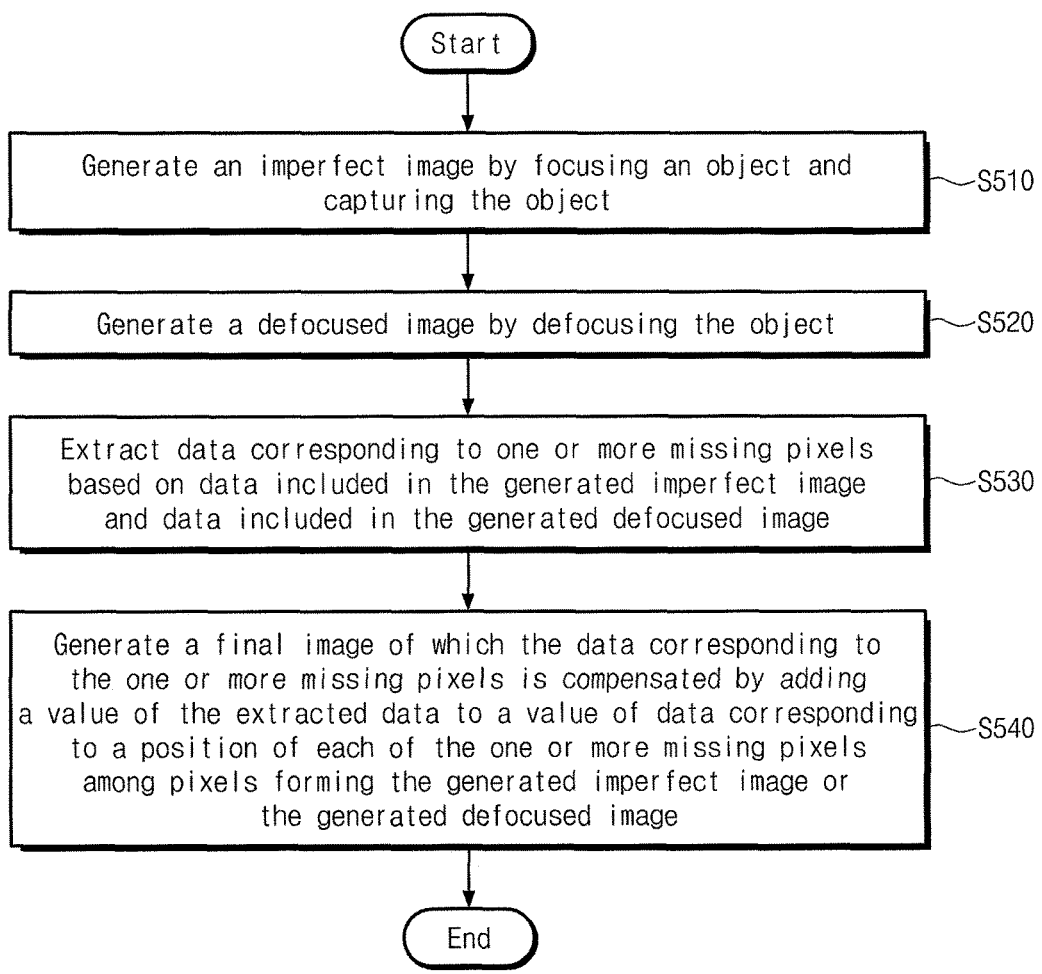

FIG. 9 illustrates another embodiment of a method of generating an image. In particular, FIG. 9 is a flow chart explaining a process of generating a final image in detail. Processes of operations S510, S520 and S530 in FIG. 9 may include the processes of operations S110, S120 and S130 in FIG. 1, respectively. The descriptions of common features already discussed in FIG. 1 are omitted.

In operation S540, the final image may be generated. While the final image is generated, data corresponding to a missing pixel may be compensated. The data corresponding to the missing pixel may be compensated by reflecting data extracted in operation S530 to at least one of an imperfect image generated in operation S510 and a defocused image generated in operation S520.

More particularly, the data corresponding to the missing pixel may be compensated by adding a value of the data extracted in operation S530 to a value of data corresponding to a position of the missing pixel among pixels forming the imperfect image generated in operation S510. The imperfect image may not include the data corresponding to the missing pixel. Thus, when the value of the extracted data is added to the value of data corresponding to the position of the missing pixel among the pixels forming the imperfect image, the final image of which the data corresponding to the missing pixel is compensated may be generated.

Alternatively, the data corresponding to the missing pixel may be compensated by adding the value of the data extracted in operation S530 to the value of the data corresponding to the position of the missing pixel among pixels forming the defocused image generated in operation S520. However, since the defocused image is generated by defocusing an object, an image processing for refocusing may be further needed.

Figure 10:
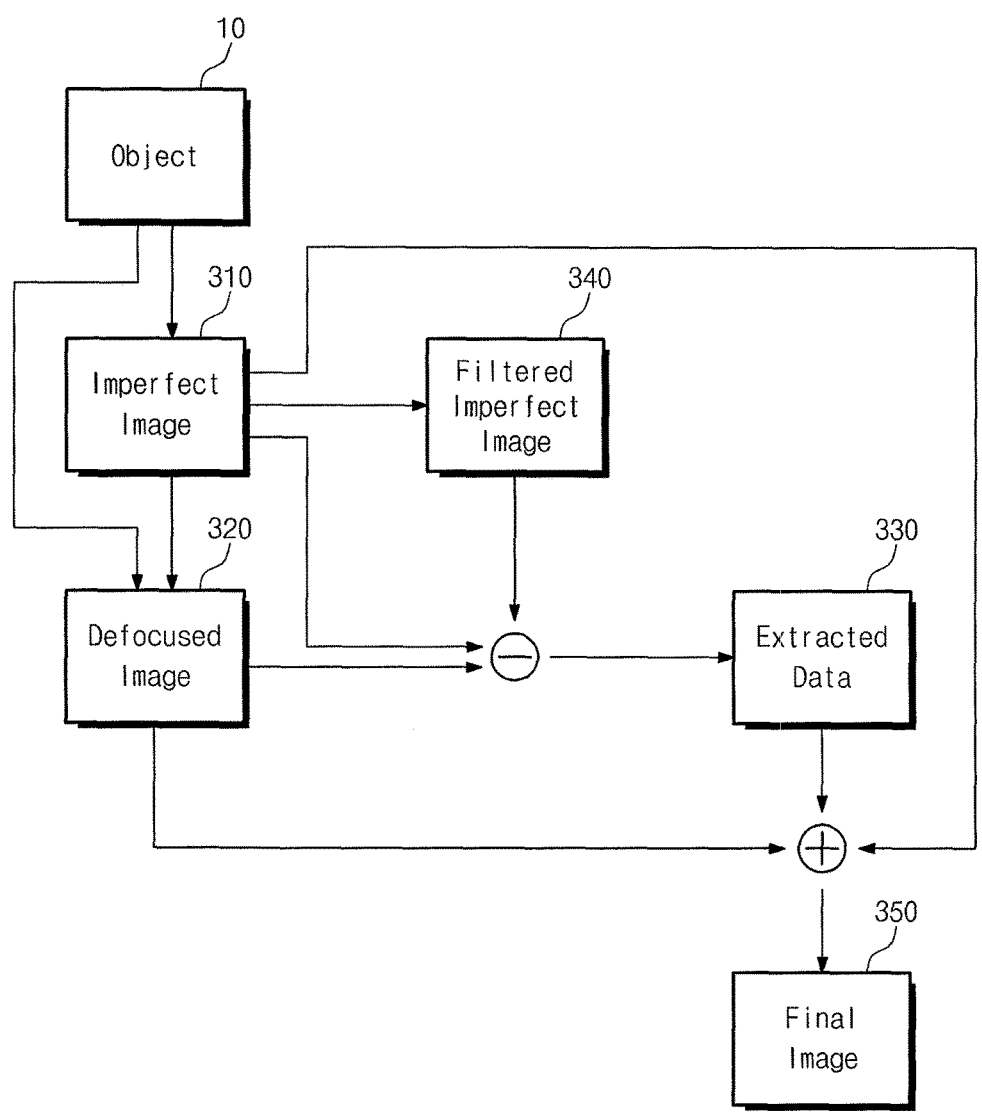
FIG. 10 illustrates an example of a process of generating an image.

FIG. 10 illustrates an embodiment of a process of generating an image according to one or more embodiments of the image generating method. An object 10 is a capturing target. An imperfect image 310 may be generated by focusing the object 10 and capturing the object 10. As described above, because of one or more missing pixels, the imperfect image 310 may not include data corresponding to the missing pixel.

Further, a defocused image 320 may be generated by defocusing the object 10. In one embodiment, as described with reference to FIG. 2, the defocused image 320 may be generated by capturing the object 10 through a moved lens and/or a moved image sensor. That is, the defocused image 320 may be generated by directly capturing the object 10. Alternatively, in another embodiment, as described with reference to FIG. 7, the defocused image 320 may be generated by performing an image processing for defocusing the imperfect image 310. That is, the defocused image 320 may be generated based on the imperfect image 310. Accordingly, the defocused image 320 may include the data corresponding to the missing pixel.

After the imperfect image 310 and the defocused image 320 are generated, the data 330 corresponding to the missing pixel may be extracted. In one embodiment, as described with reference to FIG. 8, the data 330 corresponding to the missing pixel may be extracted based on a difference between values of data respectively corresponding to pixels forming the defocused image 320 and values of data respectively corresponding to pixels forming the imperfect image 310.

In one embodiment, a filtered imperfect image 340 may be generated by performing a Gaussian filter operation on the data corresponding to the pixels forming the imperfect image 310. In this embodiment, the data 330 corresponding to the missing pixel may be extracted based on a difference between the values of the data respectively corresponding to the pixels forming the defocused image 320 and values of data respectively corresponding to pixels forming the filtered imperfect image 340. The defocused image 320 may be generated by defocusing the object 10. Thus, when the filtered imperfect image 340 on which a Gaussian filter is applied is used, a comparison with the values of the data respectively corresponding to the pixels forming the defocused image 320 may be more accurately performed. That is, to extract the data 330 corresponding to the missing pixel more accurately, the filtered imperfect image 340 may be used.

After the data 330 corresponding to the missing pixel is extracted, a final image 350 may be generated. In one embodiment, as described with reference to FIG. 9, the final image 350 may be generated by adding a value of the extracted data 330 to a value of data corresponding to a position of the missing pixel among pixels forming the imperfect image 310. Alternatively, the final image 350 may be generated by adding the value of the extracted data 330 to a value of data corresponding to a position of the missing pixel among pixels forming the defocused image 320.

According to one or more of the aforementioned embodiments, even though one or more missing pixels are included in an image sensor, the data corresponding to the missing pixel may be compensated. In particular, the data corresponding to the missing pixel may be generated by defocusing the object. Thus, the image having high quality and high reliability may be generated.

Figure 11:
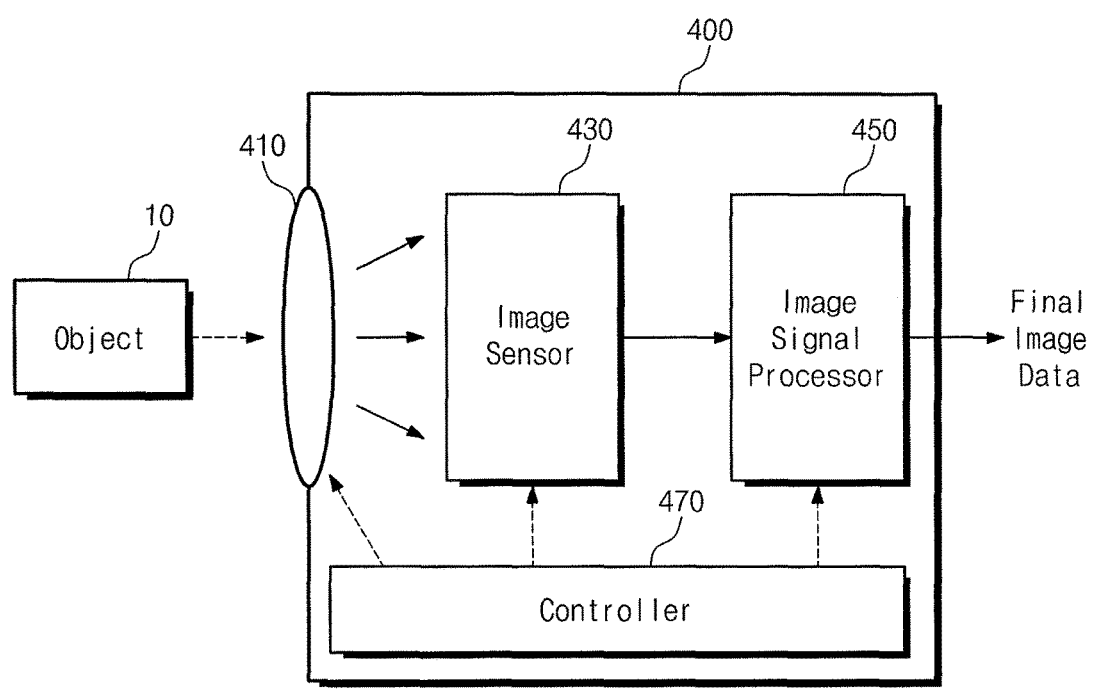
FIG. 11 illustrates an embodiment of an image generation device.

FIG. 11 illustrates an embodiment of an image generation device 400 which includes a lens 410, an image sensor 430, an image signal processor 450 and a controller 470. The lens 410 may receive light reflected from an object 10. That is, the lens 410 is a component for receiving the light. The light passing through the lens 410 may be provided to the image sensor 430.

The image sensor 430 may generate an electric signal based on a characteristic of the provided light. For instance, the image sensor 430 may generate the electric signal based on intensity of the provided light. The image sensor 430 may include a filter array formed of filters passing visible light having a specific frequency characteristic. The image sensor 430 may include a photo-sensitive array formed of photo-sensitive elements generating the electric signal according to a characteristic (e.g., intensity) of the visible light passing through each filter. The filter array and the photo-sensitive array are formed by a pixel unit. In accordance with at least one embodiment, the image sensor 430 may include one or more missing pixels.

The image signal processor 450 may generate a final image based on a characteristic (e.g., a voltage level) of the electric signal generated by the image sensor 430. In particular, the image signal processor 450 may generate the final image by compensating the data corresponding to the missing pixel according to at least one embodiment.

The control 470 may control an overall operation of the image generation device 400. The controller 470 may control operations of the lens 410, the image sensor 430 and the image signal processor 450. The controller 470 may control components of the image generation device 400 to compensate the data corresponding to the missing pixel according to at least one embodiment.

To generate an imperfect image, the controller 470 may control at least one of the lens 410 and the image sensor 430 to make the object 10 focused. When the object 10 is focused, the object 10 may be captured. The image signal processor 450 may generate the imperfect image based on a characteristic of an electric signal generated by capturing the object 10. As described above, the imperfect image may not include the data corresponding to the missing pixel.

Further, when the object 10 is defocused by a control of the controller 470, the image signal processor 450 may generate a defocused image. The defocused image may include the data corresponding to the missing pixel. In one or more embodiments, the data corresponding to the missing pixel may be generated by using "neighboring" pixels around the missing pixel.

The controller 470 may control at least one of the lens 410 and the image sensor 430 and move at least one of the lens 410 and the image sensor 430 in order to defocus the object 10. In this case, as described with reference to FIG. 2, when the object 10 is captured through the moved lens 410 and/or the moved image sensor 430, the image signal processor 450 may generate the defocused image. Alternatively, as described with reference to FIG. 7, the image signal processor 450 may generate the defocused image by performing an image processing for defocusing the imperfect image. For instance, the image signal processor 450 may defocus the imperfect image by performing a blur filter operation on data corresponding to pixels forming the imperfect image.

The image signal processor 450 may extract the data corresponding to the missing pixel based on data included in the imperfect image and data included in the defocused image. In one embodiment, as described with reference to FIGS. 8 and 10, the image signal processor 450 may extract the data corresponding to the missing pixel based on a difference between values of data respectively corresponding to pixels forming the defocused image and values of data respectively corresponding to the pixels forming the imperfect image.

The image signal processor 450 may generate a final image by reflecting the extracted data to at least one of the imperfect image and the defocused image. In one embodiment, as described with reference to FIGS. 9 and 10, the image signal processor 450 may generate the final image by adding a value of the extracted data and a value of data corresponding to a position of the missing pixel among the pixels forming the imperfect image. Alternatively, the image signal processor 450 may also generate the final image by adding the value of the extracted data and a value of data corresponding to the position of the missing pixel among pixels forming the defocused image.

Figure 12:
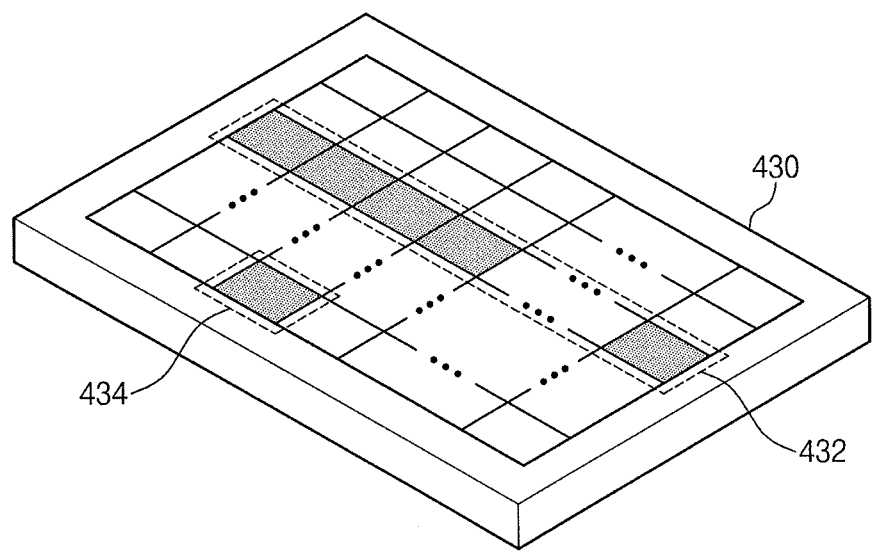
FIG. 12 illustrates an embodiment of an image sensor.

FIG. 12 illustrates an embodiment of an image sensor 430 included in an image generation device 400 (refer to FIG. 11). The image sensor 430 may be formed by a pixel unit. Each of one or more missing pixels included in the image sensor 430 may be at least one of pixels 432 for performing a function other than an image sensing function and a defective image sensing pixel 434.

The image sensor 430 may include one or more pixels 432 for performing the function other than the image sensing function. For instance, one or more pixels 432 may be pixels on which infrared ray filters used to measure a distance between an object 10 and the image sensor 430 are disposed. In particular, one or more pixels 432 may be spatially gathered. Thus, it is difficult to be restored by mathematical inference for data corresponding to one or more pixels 432. However, according to at least one embodiment, the data corresponding to one or more pixels 432 may be compensated by using "neighboring" pixels around one or more pixels 432. Thus, an image having high quality and high reliability may be generated.

In accordance with one or more embodiments, data corresponding to one or more pixels 432, which perform a function other than the image sensing function, may be properly compensated. Additional embodiments may apply to other cases. For instance, the image sensor 430 may include the defective image sensing pixel 434. The defective image sensing pixel 434 may not properly generate an electric signal for generating a final image. Also, in these or other embodiments, data corresponding to the defective image sensing pixel 434 may be effectively compensated using the "neighboring" pixels around the image sensing pixel 434.

In one or more embodiments, data corresponding to the missing pixel may be generated by defocusing the object 10. Although the missing pixel does not perform the image sensing function, the data corresponding to the missing pixel may be generated by defocusing the object 10 and using the "neighboring" pixels. Thus, when the data corresponding to the missing pixel is generated, the final image having higher quality and higher reliability may be generated as compared with the case that the data corresponding to the missing pixel is inferred by mathematical or heuristic techniques. In addition, even in the case that it is difficult to be restored for the data corresponding to the missing pixel, the data corresponding to the missing pixel may be properly generated.

Further, in one or more embodiments, one or more pixels for performing the function other than the image sensing function may be included in pixels forming an image sensor 430, because data corresponding to the pixel for performing the function other than the image sensing function may be compensated by using the "neighboring" pixels around the pixel for performing the function other than the image sensing function. Thus, the image sensor 430 may further include a different kind of sensors (e.g., a gyroscope sensor, an acceleration sensor, an optical sensor, a gravity sensor, etc.). When various types of sensors are included in one chip, manufacturing cost of the chip and space occupied by the chip may be reduced.

The expressions such as "add a value of data" and "a difference between values of data" are used in the above description. These expressions may correspond to an arithmetic operation or more than just an arithmetic operation. For example, in one embodiment, these expressions may include an image processing operation for obtaining data corresponding to a specific pixel.

Figure 13:
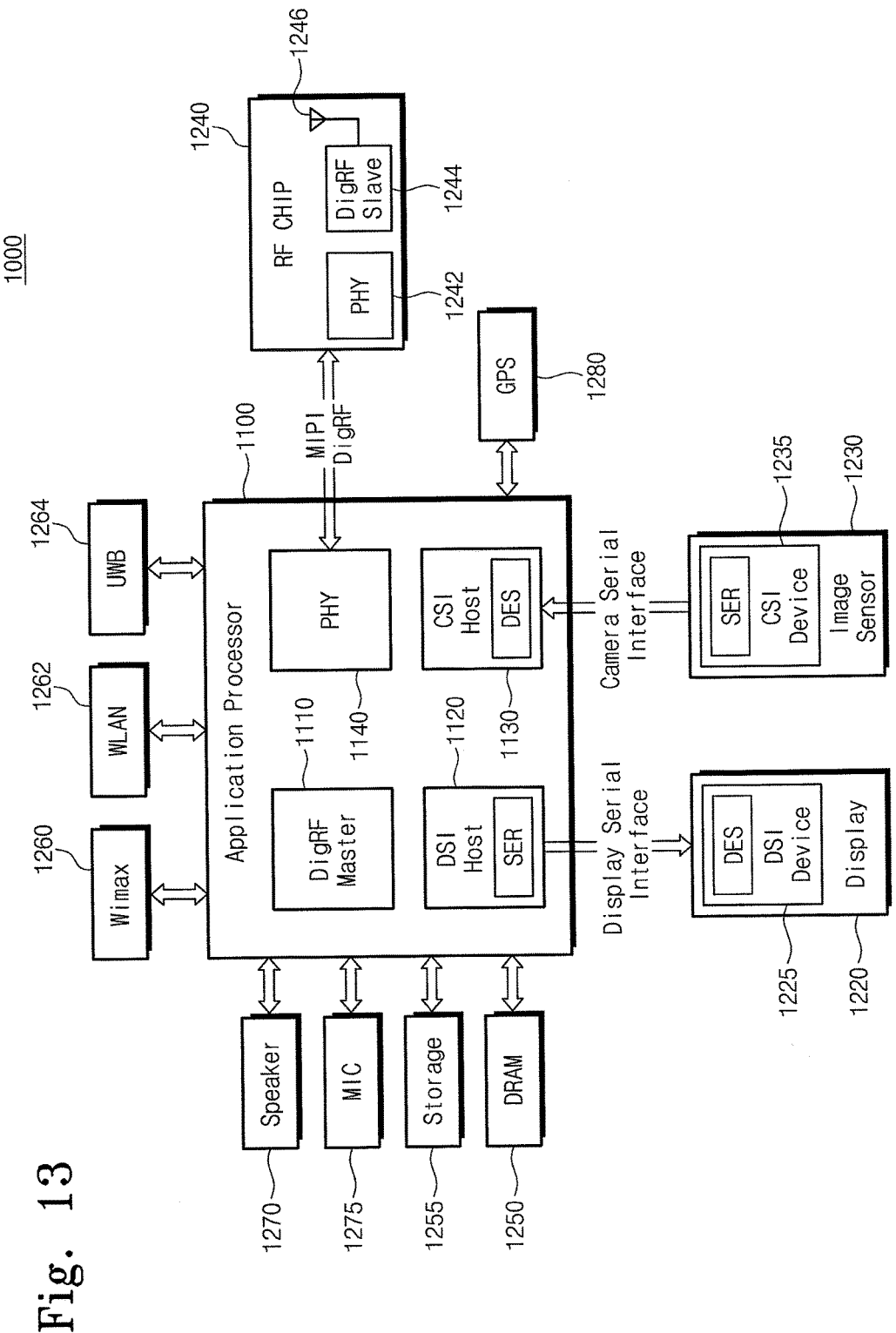
FIG. 13 an embodiment of an interface of an electronic system including an image generation device.

FIG. 13 illustrates an embodiment of an interface of an electronic system 1000 which includes an image generation device. For instance, the electronic system 1000 may be implemented by a data processing device that uses or supports a mobile industry processor interface (MIPI) interface. For example, the electronic system 1000 may be embodied in the form of a portable communication terminal, a personal digital assistant (PDA), a portable media player (PMP), a handheld computer, or a smart phone.

The electronic system 1000 may include an application processor 1100, a display 1220, and an image sensor 1230. The application processor 1100 may include a DigRF master 1110, a DSI host 1120, a CSI host 1130 and a PHY 1140.

The DSI host 1120 may communicate with a DSI device 1225 of the display 1220 through a display serial interface (DSI). For instance, an optical serializer SER may be embodied in the DSI host 1120. For instance, an optical deserializer DES may be embodied in the DSI device 1225.

The CSI host 1130 may communicate with a CSI device 1235 of the image sensor 1230 through a camera serial interface (CSI). Configurations and functions of the CSI host 1130 may include configurations and functions of the various embodiments disclosed herein. For example, the CSI host 1130 may compensate data corresponding to one or more missing pixels by using an imperfect image captured while an object is focused and a defocused image generated while the object is defocused.

Alternatively, configurations and functions of the image sensor 1230 may include configurations and functions of the various embodiments disclosed herein. For example, the image sensor 1230 may compensate the data corresponding to one or more missing pixels by using the imperfect image captured while the object is focused and the defocused image generated while the object is defocused. Further, for instance, the optical deserializer DES may be embodied in the CSI host 1130 and the optical serializer DES may be embodied in the CSI device 1235.

The electronic system 1000 may further include an RF chip 1240 that communicates with the application processor 1100. The RF chip 1240 may include a PHY 1242, a DigRF slave 1244, and an antenna 1246. For instance, the PHY 1242 of the RF chip 1240 may exchange data with the PHY 1140 of the application processor 1100 through a MIPI DigRF.

The electronic system 1000 may further include a DRAM 1250 and a storage 1255. The DRAM 1250 and the storage 1255 may store data provided from the application processor 1100. The DRAM 1250 and the storage 1255 may also provide the stored data to the application processor 1100.

For instance, the electronic system 1000 may communicate with an external system or device (not shown) through a Wimax 1260, a WLAN 1262, a UWB 1264, and so on. The electronic system 1000 may further include a speaker 1270 and a microphone 1275 for processing voice information. The electronic system 1000 may further include a GPS device 1280 for processing location information.

In accordance with one or more of the aforementioned embodiments, although one or more missing pixels are included in an image sensor, data corresponding to the missing pixels may be compensated. Thus, an image having high quality and high reliability may be generated. In particular, even when it is difficult to be restored for data corresponding to the missing pixels such as the case that two or more missing pixels are spatially gathered, the data corresponding to the missing pixels may be effectively compensated.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of generating an image by using an image capturing device, the method comprising:
   generating an imperfect image by focusing an object and capturing the object while the object is focused, the imperfect image excluding data corresponding to one or more pixel sensors;
   generating a defocused image by moving at least one of a lens and an image sensor included in the image capturing device, the defocused image including the data corresponding to the one or more pixel sensors, the data corresponding to the one or more pixel sensors being generated by using neighboring pixel sensors around the one or more pixel sensors;
   extracting the data corresponding to the one or more pixel sensors based on data included in the generated imperfect image and data included in the generated defocused image; and
   generating a final image by reflecting the extracted data to at least one of the generated imperfect image or the generated defocused image, wherein generating the final image includes compensating the data corresponding to the one or more pixel sensors by adding a value of the extracted data and a value of data corresponding to each pixel of each position of the one or more pixel sensors among pixels forming the generated imperfect image or the generated defocused image.

2. The method of claim 1, wherein each of the one or more pixel sensors corresponds to a defective image sensing pixel or a pixel for performing a function other than an image sensing function.

3. The method of claim 1, wherein generating the imperfect image includes performing a Gaussian filter operation on data corresponding to pixels forming an image that is obtained by capturing the object while the object is focused.

4. The method of claim 1, wherein generating the defocused image includes capturing the object through the at least one of the moved lens or the moved image sensor.

5. The method of claim 1, wherein extracting the data corresponding to the one or more pixel sensors includes extracting the data corresponding to the one or more pixel sensors based on a difference between values of data respectively corresponding to pixels forming the generated defocused image and values of data respectively corresponding to pixels forming the generated imperfect image.

6. An image generation device, comprising:
   a lens to receive light reflected from an object;
   an image sensor to generate an electric signal based on the received light;
   an image signal processor to generate a final image based on the generated electric signal; and
   a controller to control operations of the lens, the image sensor and the image signal processor, wherein:
   the image signal processor is to generate an imperfect image by focusing an object and capturing the object while the object is focused, the imperfect image excluding data corresponding to one or more pixel sensors,
   the controller is to move at least one of the lens or the image sensor to defocus the object,
   the image signal processor is to generate a defocused image by capturing the object through the at least one of the moved lens or the moved image sensor, the defocused image including the data corresponding to the one or more pixel sensors, the data corresponding to the one or more pixel sensors being generated by using neighboring pixel sensors around the one or more pixel sensors,
   the image signal processor is to extract the data corresponding to the one or more pixel sensors based on data included in the generated imperfect image and data included in the generated defocused image, and
   the image signal processor is to generate the final image by reflecting the extracted data to at least one of the generated imperfect image and the generated defocused image,
   wherein the image signal processor is to compensate the data corresponding to the one or more pixel sensors by adding a value of the extracted data and a value of data corresponding to each pixel of each position of the one or more pixel sensors among pixels forming the generated imperfect image or the generated defocused image.

7. The device of claim 6, wherein each of the one or more pixel sensors corresponds to a defective image sensing pixel or a pixel for performing a function other than an image sensing function.

8. The device of claim 6, wherein the image signal processor is to generate the imperfect image by performing a Gaussian filter operation on data corresponding to pixels forming an image that is obtained by capturing the object while the object is focused.

9. The device of claim 6, wherein the image signal processor is to extract the data corresponding to the one or more pixel sensors based on a difference between values of data respectively corresponding to pixels forming the generated defocused image and values of data respectively corresponding to pixels forming the generated imperfect image.

10. A method of generating an image by using an image capturing device, the method comprising:
    generating an imperfect image by focusing an object and capturing the object while the object is focused, the imperfect image excluding data corresponding to one or more pixel sensors;
    generating a defocused image by performing an image processing for making the imperfect image defocused;
    extracting the data corresponding to the one or more pixel sensors based on data included in the generated imperfect image and data included in the generated defocused image; and
    generating a final image by reflecting the extracted data to at least one of the generated imperfect image and the generated defocused image, wherein generating the final image includes compensating the data corresponding to the one or more pixel sensors by adding a value of the extracted data and a value of data corresponding to each pixel of each position of the one or more pixel sensors among pixels forming the generated imperfect image or the generated defocused image.

11. The method of claim 10, wherein generating the defocused image includes performing a blur filter operation with respect to data corresponding to pixels forming the imperfect image.

12. The method of claim 10, wherein the image processing compensates the data corresponding to the one or more pixel sensors.

13. The method of claim 10, wherein the defocused image includes the data corresponding to the one or more pixel sensors.

14. The method of claim 10, wherein extracting the data corresponding to the one or more pixel sensors is performed based on a difference between values of data corresponding to pixels forming the generated defocused image and values of data corresponding to pixels forming the generated imperfect image.

* * * * *